United States Patent [19]

Sheridon

[11] Patent Number: 4,538,163

[45] Date of Patent: Aug. 27, 1985

[54] FLUID JET ASSISTED ION PROJECTION AND PRINTING APPARATUS

[75] Inventor: Nicholas K. Sheridon, Saratoga, Calif.

[73] Assignee: Xerox Corporation, Stamford, Conn.

[21] Appl. No.: 471,380

[22] Filed: Mar. 2, 1983

[51] Int. Cl.[3] .......... G01D 15/06

[52] U.S. Cl. .......... 346/155; 346/159

[58] Field of Search .......... 346/155, 159; 250/325-326; 361/229, 230; 315/111.8

[56] References Cited

U.S. PATENT DOCUMENTS 3,396,308 8/1968 Whitmore .......... 250/326
3,978,492 8/1976 Simm .......... 346/159
4,409,604 10/1983 Fotland .......... 346/159
4,426,654 1/1984 Tarumi et al. .......... 346/159
4,463,363 7/1984 Gundlach et al. .......... 346/159

*Primary Examiner*—Thomas H. Tarcza
*Attorney, Agent, or Firm*—Serge Abend

[57] ABSTRACT

A fluid jet assisted ion projection and printing apparatus wherein substantially equal numbers of positive and negative ions are generated simultaneously during a series of RF arc breakdowns which take place within a fluid transport channel passing through the body of the apparatus. The rapidly moving fluid stream, passing through the channel, transports the ions which may be allowed to pass out of the body or may be neutralized within the body by ion modulation electrodes within the channel. Ions of a selected sign may be accelerated toward and deposited, in an imagewise pattern, upon a relatively moving charge receptor.

18 Claims, 11 Drawing Figures

FLUID JET ASSISTED ION PROJECTION AND PRINTING APPARATUS

This invention relates to an ion projection and printing apparatus wherein both positive and negative ions are generated simultaneously during a series of RF (radio frequency) arc breakdowns which take place within a fluid transport channel passing through the body of the apparatus. The thus created ions, of both signs, are entrained in a rapidly moving fluid stream passing through the channel, and may be allowed to pass out of the body or be neutralized within the body by ion modulation electrodes, supported by the body, at the exit zone of the channel. Ions of a selected sign may be accelerated toward and deposited, in an imagewise pattern, upon a relatively moving charge receptor.

It has long been desired to provide a reliable, high resolution non-contact printing system. An approach to this end is ion projection printing which, in one form, entails depositing electrostatic charges in a latent image pattern directly upon a charge receptor surface and then rendering the charge pattern visible, in some known manner. A printing mechanism designed to embody these principles would be simple in construction and would eliminate friction and mechanical wear in usage. Typically, ion projection printing comprises the generation of a large population of ions of a desired polarity and their transportation to and selective deposition upon a charge receiving surface.

In U.S. Pat. No. 3,495,269 (Mutschler et al) entitled "Electrographic Recording Method and Apparatus With Inert Gaseous Discharge Ionization and Acceleration Gaps" there is taught a pin electrode ion projection apparatus wherein ions are selectively generated, prior to being accelerated to the receptor surface by a high voltage backing electrode. As the complex generating structure must be duplicated for each pixel, it appears that this approach would be commercially impractical.

In U.S. Pat. No. 3,673,598 (Simm et al) entitled "Apparatus for the Recording of Charge Images" there is disclosed in combination, a corona wire ion generator, which will generate a uniform supply of ions, coupled with a modulation structure comprised of two spaced conductive apertured plates. By adjusting the potential difference between the plates, ions are allowed to pass through the apertures or are inhibited from passing therethrough. Those ions allowed to pass through the modulation structure are then attracted to a charge receptor surface by a high voltage backing electrode.

In three patents granted to IBM in 1973, yet another ion projection printing approach is taught. U.S. Pat. No. 3,715,762 (Magill et al) entitled "Method and Apparatus for Generating Electrostatic Images Using Ionized Fluid Stream", U.S. Pat. No. 3,752,951 (McCurry) entitled "Electro-Ionic Printing" and U.S. Pat. No. 3,742,516 (Cavanaugh et al) entitled "Electro-Ionic Printing Apparatus" each disclose an ion projection printing system using a controlled ion transporting fluid stream for discharging precharged areas of a charge receiving surface. Each incorporates the ion generation chamber described and illustrated in U.S. Pat. No. 3,715,762. It comprises an array of corona generating needles adjacent an array of apertures; one for each image dot to be produced. Considering the teachings of these patents one may, selectively, either (a) fluidically direct portions of the ion transporting stream upon a receptor surface ('762), (b) pass the ion transporting stream through electroded tubes ('951) or, (c) pass the ion transporting stream through an electroded modulating slot ('516), in order that ions may be deposited on an image receptor. It should be apparent that as in the case of the Mutschler et al structure, in order to obtain high resolution printing, on the order of about 200 dots per inch, a very complex and expensive structure would be required. Consider the implications of manufacturing a corona generating head incorporating hundreds and even thousands of needles, each properly spaced from and aligned with a related orifice. A major shortcoming of the modulation structures of the '951 and '516 patents is the substantial amount of insulating material within the exit zones which will accumulate charge thereon and deleteriously effect image control.

A successful high resolution, low cost approach to achieving an ion projection printing system is disclosed in U.S. Pat. No. 4,468,363 entitled Fluid Assisted Ion Projection Printing (Gundlach et al), assigned to the same assignee as the instant application. In that application, there is disclosed an ion projection printing apparatus through which a jet of transport fluid is passed for transporting ions out of the generator to a modulation structure, from which high velocity narrow "beams", of sufficient current density for high resolution marking, may be discharged upon a charge receptor surface. Ions of a desired polarity are uniformly created in a corona discharge generating cavity through which a fluid jet is passed. A portion of the ion population within the ion generating cavity are entrained in the fluid stream exiting therefrom and are transported through a low voltage modulation structure. Within the modulation structure, the ion flow may be selectively controlled for either neutralizing the ions or allowing the ions to pass, in the form of selected "beams", to be accelerated to the charge receptor surface by a suitable accelerating electrode.

In order to achieve ion projection printing having speed and resolution higher than has heretofore been possible, it is necessary to obtain ion output currents at least an order of magnitude greater prior structures. To this end, it would be desirable to provide an ion projection structure which would first create a large population of ions, and then be able to use the greater portion of the created ions for printing. This would be possible if the ions were created directly within a fluid jet transport passage. Therefore, it is an object of this invention to provide a unique, simple, low cost, fluid flow assisted, high speed, high resolution ion projection printing apparatus. It is also an object of this invention to generate ions within the ion projection passage so that substantially all the ions generated may be useful.

It is a further object of this invention to be able to create simultaneously both positive and negative ions to enable marking with developer materials having an affinity for either species, as desired.

The present invention may be carried out, in one form, by providing a fluid jet assisted ion projection apparatus for placing electrostatic charges upon a relatively moving charge receptor. The apparatus includes a source of ionizable, transport fluid, such as air, and an ion projection housing having a narrow channel therethrough for receiving the fluid. The housing includes means adjacent the channel, for generating a series of RF arc discharges for creating simultaneously a population of positive and negative ions directly in the transport fluid moving within and through the channel.

In another form, the invention may be used as a fluid jet assisted electrographic marking apparatus for placing electrostatic charges in an imagewise pattern upon a relatively moving charge receptor. The marking apparatus includes a source of ionizable, transport fluid, such as air, and an ion projection housing having a narrow channel therethrough for receiving the fluid. The housing includes an upstream, ion generating portion, adjacent the channel, within which a series of RF arc discharges may be initiated for creating simultaneously a population of positive and negative ions directly in the transport fluid moving within the channel. The housing also includes a downstream, ion modulation portion, adjacent the channel, within which a modulation structure, comprised of a plurality of spaced individually controllable electrodes, is located. The ion laden fluid transports both positive and negative ions into and through the modulation structure, which selectively controls the outflow of ion beams from the channel. Exiting ions of the desired polarity are attracted to a spaced, charge receptor surface, disposed upon an acceleration electrode, which attracts ions of one polarity while repelling ions of the opposite polarity.

Other objects and further features and advantages of this invention will be apparent from the following description considered together with the accompanying drawings wherein.

Figure 3A:
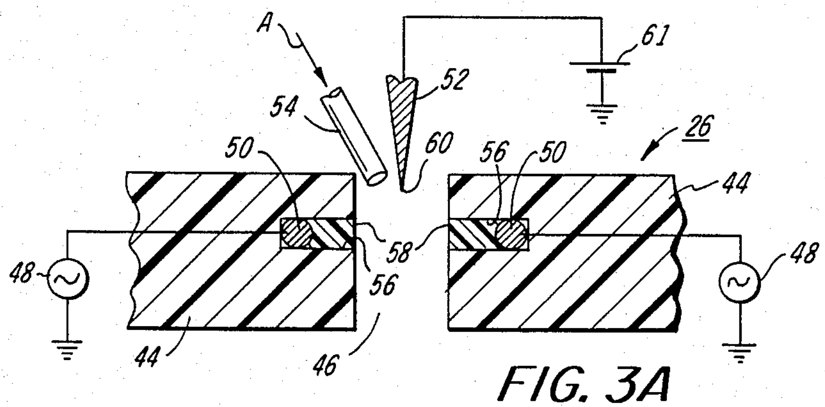
Figure 3B:
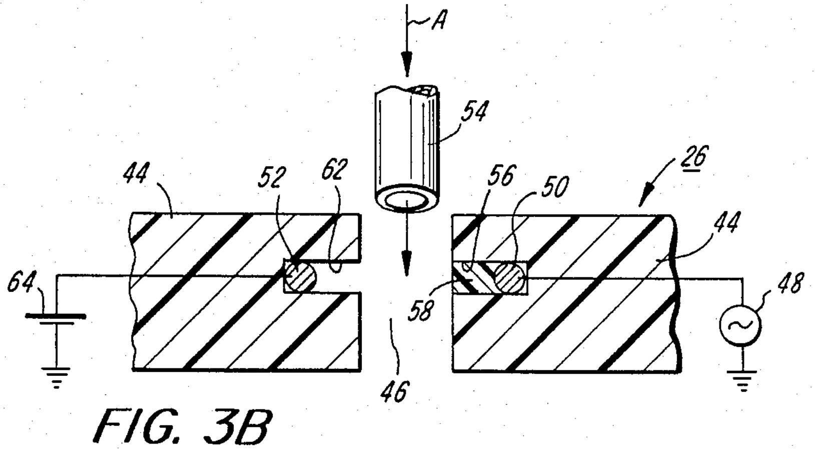
Figure 3C:
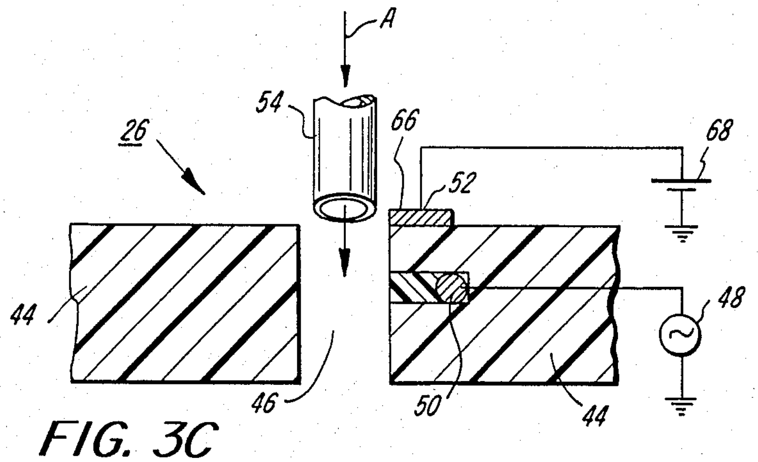
Figure 4A:
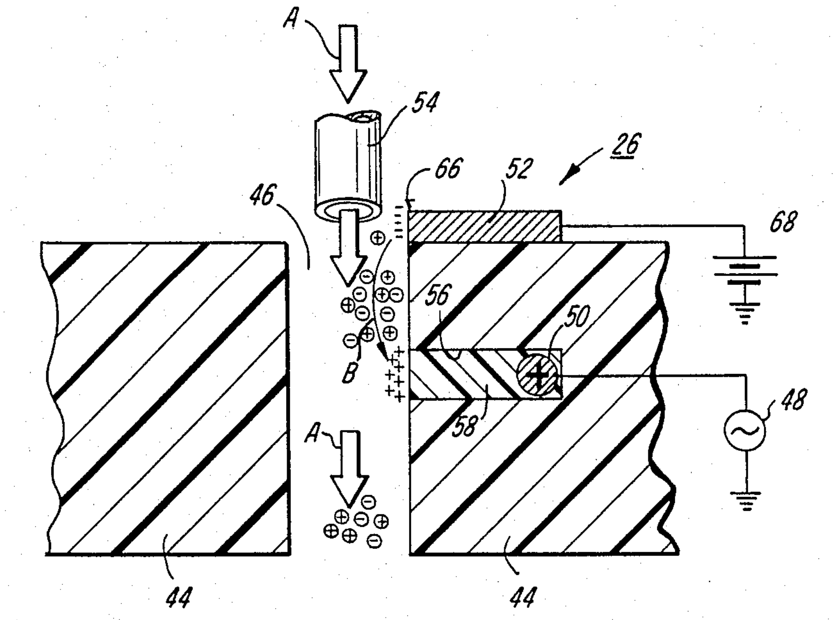
Figure 4B:
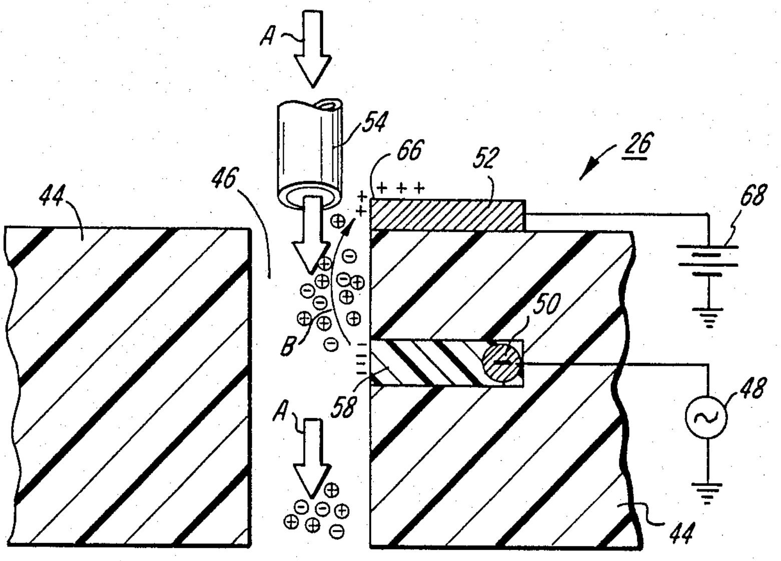
Figure 5:
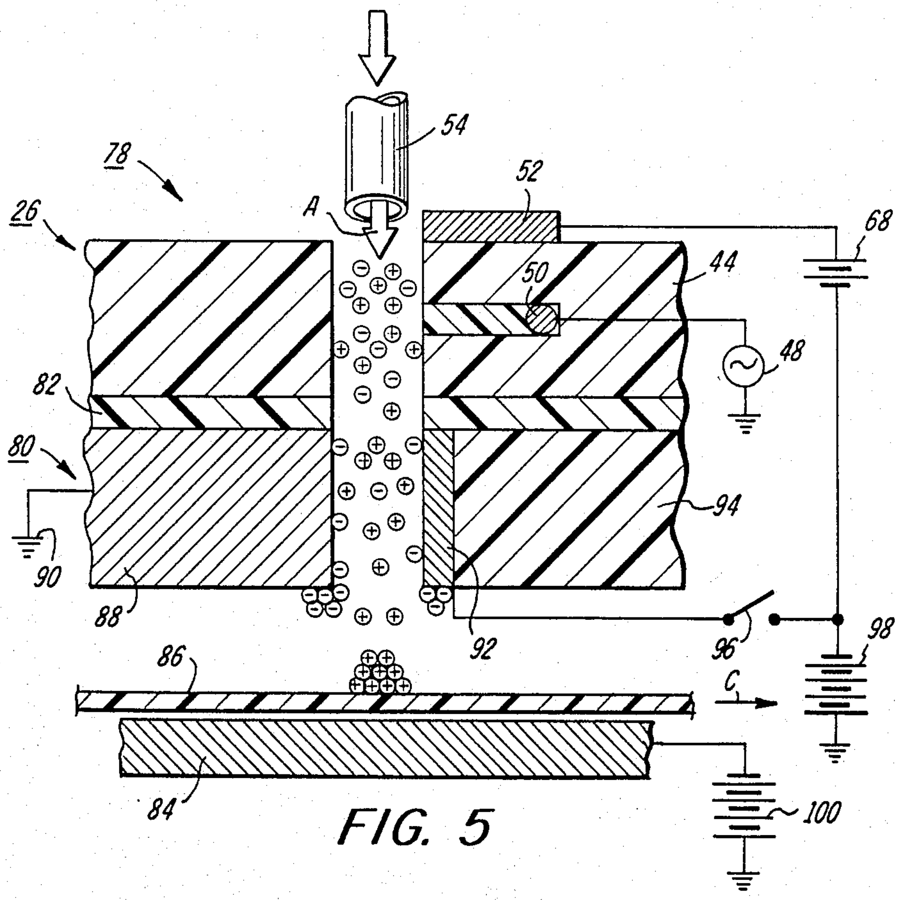
Figure 6:
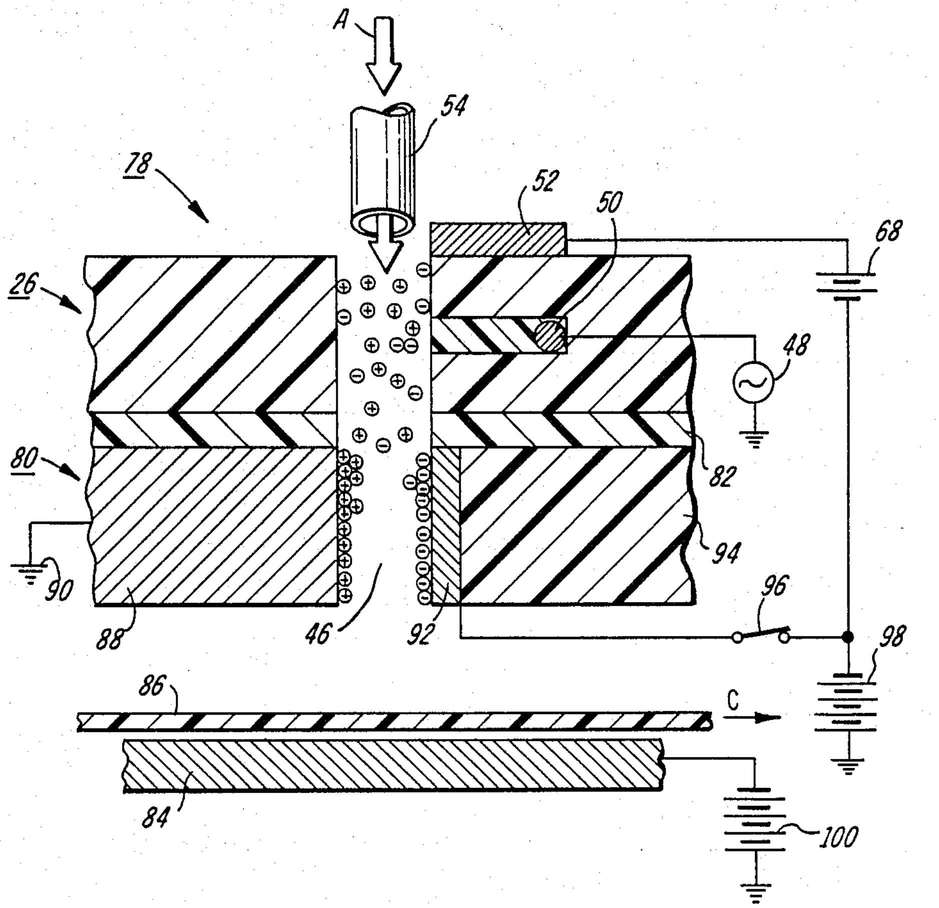
Figure 7:
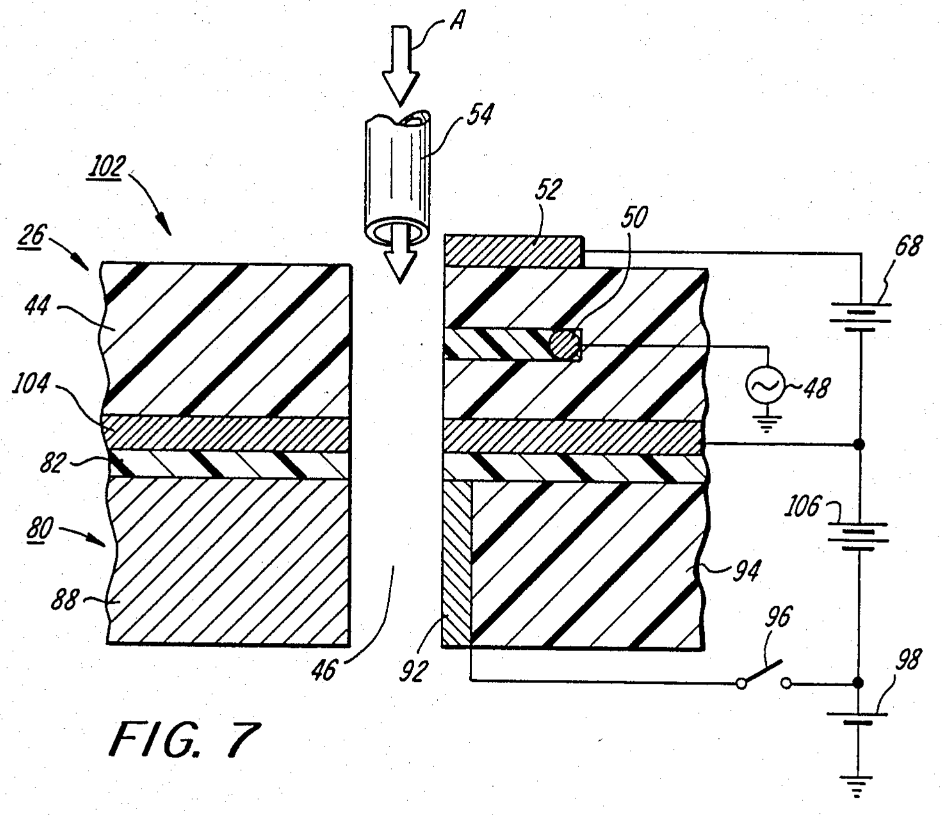

FIGS. 3*a* through 3*d* are cross-sectional elevation views of other forms of the RF arc discharge ion generator portions of this invention;

FIGS. 4*a* and 4*b* are enlarged views of FIG. 3*c* showing the mechanism of ion generation during RF arcing;

FIG. 5 is a cross-sectional elevation view of the ion projection printing apparatus of this invention, showing the ion flow path when a modulation electrode allows "writing" to occur;

FIG. 6 is a view similar to that of FIG. 5 showing the ion flow path when a modulation electrode inhibits "writing"; and FIG. 7 is a cross-sectional elevation view of an alternate embodiment of the ion projection printing apparatus of this invention.

Figure 1:
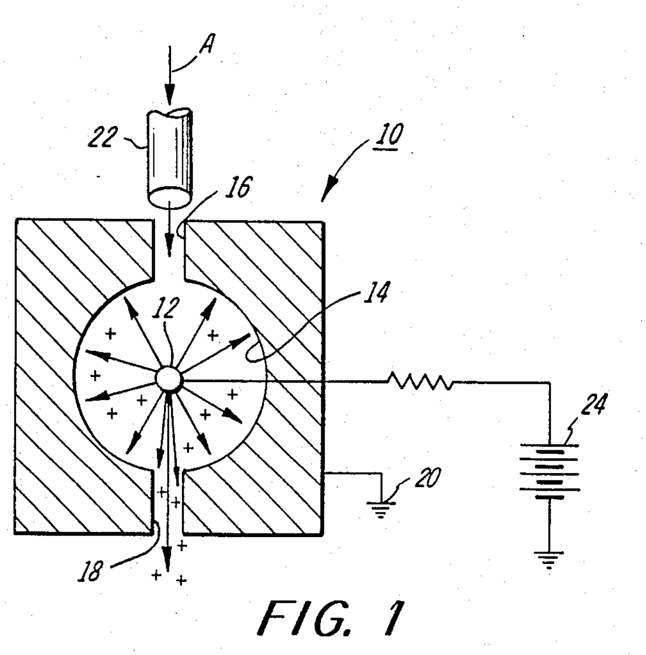
FIG. 1 (PRIOR ART)
FIG. 1 is a cross-sectional elevation view of the prior art corona ion generator portion of assignee's copending U.S. patent application Ser. No. 395,170.

With particular reference to the drawings, there is illustrated in FIG. 1 the corona ion generator portion 10 of assignee's copening U.S. Pat. No. 4,463,363. It comprises a corona wire 12, extending substantially coaxially within a conductive cylindrical chamber 14 of an ion generator housing having an axially extending inlet slit 16 and an axially extending slit outlet 18. The housing is connected to a source of reference potential 20, which may be electrical ground. A source of ionizable transport fluid, preferably air, directs the fluid, represented by arrow A, into the chamber through suitable means, here illustrated as tube 22. A high potential source 24, on the order of several thousand volts D.C., may be applied to the wire 12 for generating a uniform corona discharge along the entire exposed length of the wire in the space between the wire and the conductive chamber walls. The corona discharge creates ions, of the same polarity as the voltage source, in the air around the wire, which will be attracted to the conductive walls, as indicated by the radially extending arrows within the chamber. By entraining a large enough percentage of the total ion space charge in the air flow exiting through the chamber outlet slit 18, the output ion current may be sufficient for "writing" on a charge receptor.

Typically, the useful parameters of the FIG. 1 corona ion generator have been found to be the following: the cylindrical corona chamber 14 is about one-eight of an inch in diameter; the corona wire 12 is about three to four mils in diameter; the inlet air slit 16 into the chamber is about ten to twelve mils wide; the outlet slit 18 is about three to five mils wide; and the corona potential source 24 is about 2000 to 3000 volts D.C. Ion output current on the order of 0.5 $\mu$a/cm of slit length appears to be the best achievable.

The limited ion current output of the corona ion generator 10 may be attributed to two major factors. First, a space charge limited situation prevails, since the corona discharge creates ions of predominantly one sign, which tend to repel one another into the grounded chamber walls 14, where they are neutralized. Second, as has been stated, the useful ion current output is that entrained in the fluid flow through the outlet slit 18 which represents only a small portion of the total number of ions generated in the corona discharge. It has been found that a slightly higher output current may be achieved by locating the corona wire off axis, some small distance closer to the outlet slit. Logic would lead one to place the corona wire into the outlet slit or so close to it that all of the created ions would be entrained in the air flow. However, corona generating devices do not lend themselves to uniform operation within the confines of such a narrow passage, since in order for the passage to be useful for marking purposes it must be on the order of a few mils wide, approximately the diameter of a corona wire 12. The very small dimensions required, coupled with the presence of exposed conductive surfaces, one carrying a very high voltage, would inevitably result in spark discharge a discrete points along the wire rather than uniform corona discharge.

In FIGS. 2 and 3*a* through 3*d* there are illustrated various embodiments of the ion generation portion 26 of the ion projecting printing apparatus of the present invention. Each is designed so that a series of RF arc discharges will occur within a fluid transport channel, creating a large population of ions, comprising both positive (+) and negative (−) species, directly with the channel by a mechanism to be described below with reference to FIGS. 4*a* and 4*b*. The central concept illustrated in these embodiments is that the series of RF arc discharges will take place between a buried RF electrode and the field concentrating region of a field electrode.

Figure 2:
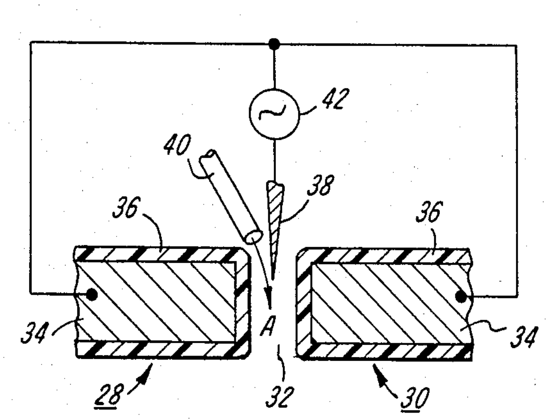
FIG. 2 is a cross-sectional elevation view of one form of the RF arc discharge ion generator portion of the present invention.

The FIG. 2 embodiment of the ion generation portion 26 includes two flat plates 28 and 30 separated by a channel 32, which is on the order of two mils wide. Each plate comprises a conductive core 34, such as brass, about ten mils thick, overcoated, on at least three sides, with a dielectric sheathing 36, preferably glass, bonded to the surface of the brass core. An exposed electrically conductive knife edge, such as razor blade 38, is placed between the plates 28 and 30 so that there is an air gap of about one mil between the sharp edge of the blade and each of the plates. Transport fluid, preferably air, schematically represented by arrow A, is directed to the channel 32 through the tube 40 and is forced through the channel. The source 42 of an alternating electrical field, such as an RF voltage, in the range of 2000 to 6000 volts A.C. (peak-to-peak) and of a frequency in the range of 13 KHz to 4 MHz, has been applied between the blade 38 and the glass coated conductive plates 34. As the voltage varies sinusoidally an RF discharge, comprised of a series of self extinguishing arcs, each arc lasting for some fraction of a half cycle, will be generated between the facing channel walls and the blade 38. It is believed that each discharge creates a plasma containing substantially equal numbers of positive and negative ions which are swept through the channel 32 by the air flow. Output ion current on the order of 10 μa/cm of channel length has been easily achieved. This represents an order of magnitude improvement over the FIG. 1, prior art, configuration.

In each of the design variations of the ion generation portions illustrated in FIGS. 3*a* through 3*d* similar elements will be identified with similar numbers. It should be noted that the drawings are merely illustrative of the interrelationship of elements and are not drawn to scale. In each drawing, a dielectric body 44 has a transport fluid channel 46 therethrough, in which the series of RF arc discharges is generated. An RF voltage source 48 is connected to an RF electrode 50, in the form of a wire, embedded in the dielectric body 44. A field electrode 52 having a geometry capable of concentrating field lines is supported adjacent the channel 46. Thus, RF arc discharges between the RF electrode 50 and the field electrode 52 will create ions directly within the moving transport fluid A introduced into the channel by some suitable means, herein represented by tube 54. It is necessary to "bury", or insulate the RF electrode to prevent isolated spark zones at high field concentrations along that electrode and to insure a uniform capacitive charge build-up at the channel wall on the surface of the dielectric, which will break down eventually to yield a uniform arc discharge. In FIG. 3*a*, the RF voltage source 48 is applied to each of two RF electrodes 50 embedded in grooves 56 cut into the dielectric body 44. Each groove is about twelve to fifteen mils deep and slightly wider than three mils, to receive the RF electrode wire which is about three mils in diameter. The grooves are filled, between the wire and the channel 46, with a dielectric material 58. It is important that the dielectric body 44, the wire electrode 50 and the backfill material 58 each have substantially the same coefficient of thermal expansion, in order that there will be no cracking of the assembly on repeated heating and cooling. Preferably, the dielectric body 44 is of aluminum oxide, although any ceramic material is suitable, the wire electrode 50 is platinum, and the backfill material 58 is glass frit. Inorganic materials are desired, because RF voltages are more destructive of organic materials. Platinum is the material of choice for the wire electrode for the additional reasons that it does not oxidize under conditions of high temperature and strong field and it is resistant to sputtering. The sharp edge 60 of the field electrode 52 is located adjacent the entrance of the channel 46. The transport fluid A, flowing through the channel captures and transports the population of positive and negative ions, created between the electrodes, through the device (as illustrated in FIGS. 5 and 6). Typically, in this embodiment, the RF source has been about 6000 volts AC and the DC reference potential source 61 connected to the blade has been on the order of 200 to 600 volts.

In FIG. 3*b*, the field electrode 52 comprises a second wire disposed within a groove 62 in the opposing wall of the dielectric body 44. A reference potential source

64 connected to the field electrode wire 52, is typically on the order of 200 to 600 volts DC, although the electrode could be connected directly to ground.

In FIG. 3*c* the field electrode 52 takes the form of a foil strip, preferably made of platinum, disposed upon one side of the dielectric body 44, at the entrance of the channel 46. It presents a sharp corner edge 66 for concentrating the electrical field, prior to arcing. As illustrated, a reference potential source 68, on the order of 600 to 800 volts DC, has been connected to the foil strip field electrode 52. In this embodiment, the RF voltage may be on the order of 4000 to 5000 volts AC.

Figure 3D:
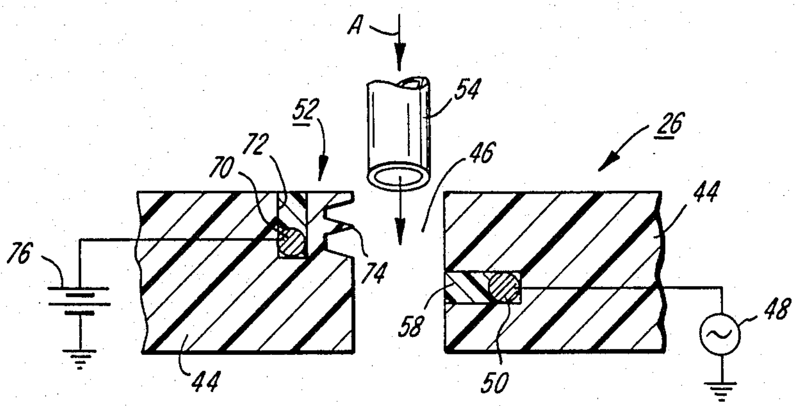

In FIG. 3*d*, the field electrode 52 comprises in combination a buried conductive electrode wire 70, disposed in a backfilled groove 72 in the dielectric body 44, opposite the RF electrode 50, and an adjacent sharp point 74 undercut in the dielectric body, within the channel 46. A reference potential source 76, on the order of 600 to 800 volts DC has been connected to the field electrode wire 70. The sharp point 74 will serve to concentrate the field, prior to arcing, in the same manner described in the foregoing embodiments.

It is believed that the voltage applied to the RF electrodes, in the various forms shown, could perhaps be in a range as broad as 1000 to 10,000 volts AC and of a frequency in a range as broad as 1 KHz to 100 GHz. Similarly, it is believed that the voltage applied to the field electrode, may be in a range as broad as 0 to 2000 volts DC.

The following description sets forth the best present understanding of the RF discharge mechanism taking place within the channel during the creation of ions needed for marking. The high frequency, high voltage AC imposed upon the RF wire is sinusoidal, rising first to a peak positive value, crossing to a peak negative value, and so on. In FIGS. 4*a* and 4*b*, the embodiment disclosed in FIG. 3*c* is used to describe the RF discharge mechanism, first as the wire goes positive (+), in FIG. 4*a* and then as the wire goes negative (−), in FIG. 4*b*.

As the wire rises to its maximum positive value, in the "first" phase of its cycle, (note the + on the RF electrode wire 50) a strong electric field is imposed around the wire across the dielectric materials 44 and 58, causing the molecules within the dielectric materials to tend to align themselves in the field. Thus, the negative ends of the molecules align toward the positively charged wire. Since the dielectric material has its minimal thickness between the embedded RF electrode wire 50 and the channel wall, a large polarization charge (note the + symbols at the channel wall) will appear in the channel. These polarization charges induce an equal and opposite chage to appear at the surface of the exposed field electrode 52 (note the − symbols adjacent the foil strip), concentrating at the sharp edge 66. As the field strength continues to increase there will come a time when the air between the electrodes can no longer sustain the field thereacross. Then air breakdown will occur, accompanied by an arc discharge which creates a plasma comprising substantially equal numbers of positive and negative ions.

At the instant that the air breakdown is initiated, it is believed that a few free electrons are pulled out of the air to bombard the positively charged element (in this case, the dielectric channel wall adjacent the RF electrode). In the process of being suddenly accelerated toward the positively charged surface, the free electrons will collide with neutral gas atoms in the transport air. If their energy is high enough, they will cause additional electrons to break loose from the gas atoms, starting an avalanche of electrons toward the positively charged surface. Conversely, positive ions in the air will tend to be accelerated to the surface of the negatively charged conductive field electrode 52. If the energy of the positive ions is high enough, they will knock secondary electrons out of the conductive surface upon striking it, starting an avalanche that proceeds generally from the metal electrode. The highly mobile electrons will in turn leave the conductive surface, being accelerated in the field, gaining energy as they leave, and colliding with more neutral gas atoms in the air, producing more positive ions, electrons and negative ions (indicated by + and − symbols within circles). The arc induced breakdown of the air, shown schematically by the arrow B in the external gap between the electrodes, generates a plasma in the gap, in which there are substantially equal numbers of positive ions and negative ions (including free electrons). These ions are transported by the moving air stream, as shown.

In addition to being transported by the moving air stream, negative ions will be attracted to the polarization charge at the channel wall and positive ions will be attracted to the opposite charge at the conductive field electrode. Soon, sufficient negative ions will have been attracted to the positive polarization charge and will have deposited on the channel wall, nullifying the field across the external air gap. Thus, continued air breakdown will be extinguished. The positive ions having been attracted to the negative charge on the field electrode will simply be neutralized.

By this time, the buried RF electrode will be going to its maximum negative value, as illustrated in FIG. 4*b*. The same mechanism will occur in the opposite sense, as shown. Once again arcing will occur between the charge induced by the RF electrode 50 and the exposed field electrode 52, creating a large population of positive and negative ions directly in the channel 46, until it is self-quenched. Each arc discharge, which will last for some fraction of a half cycle, is self-extinguishing and is probably complete in times on the order of a microsecond or less.

The next two drawings, FIGS. 5 and 6, show the ion generation portion 26 in a useful environment, namely, an ion projection printing head 78. The head includes the ion generation portion and an ion modulation portion 80, separated by a dielectric interface plate 82. Spaced from the printing head, in a downstream direction, is a conductive accelerating electrode plate 84 over which the charge receptor 86, which may be a sheet of ordinary paper, passes for collecting ions in a desired image configuration. Once a supply of positive and negative ions have been created within the channel 46 of the ion generator 26, the transport fluid A, introduced through the tube 54, moves them into the influence of the modulation portion 80. In the modulation portion, on one side of the channel 46, there is a conductive, modulation plate 88, connected to a reference potential source 90, which may be ground, as shown. On the opposite side of the channel 46 there are a number of spaced, individually addressable, modulation electrodes 92 in the form of conductive stripes, spaced from one another by insulating regions (not shown). Although only one modulation electrode 92 is shown, mounted upon an insulating plate 94, it should be understood that the long dimension of each of the conductive stripes extends in the direction of transport fluid flow and the short dimension of each, on the order of two to three mils wide, extends into the plane of the drawing.

When the switch 96, connecting the modulation electrode 92 to the modulation bias source 98 of about five to ten volts DC, is open (FIG. 5), the positive and negative ions are free to escape from the channel 46. As soon as the ions approach the open end of the channel, they come under the influence of a very high accelerating field. The field is established between the accelerating electrode 84, connected to a high voltage bias source 100, on the order of 2000 to 3000 volts DC, and the ion projection printing head 78. Either exiting positive or negative ions may be attracted to the surface of the moving charge receptor, depending on the selected sign of the field bias on the accelerating electrode 84. In the preferred form shown, a negative bias is imposed on the accelerating electrode to attract the positive ions. Then, the charge receptor 86, bearing an imagewise pattern of positive ions thereon, is moved, as indicated by the arrow C, to a remote development zone (not shown) where oppositely charged marking particles are attracted to the ion patterns for rendering the electrostatic image visible. From there, the marking particles may be permanently affixed to the charge receptor 86 by any one of a number of known methods. The very high negative bias on the accelerating electrode 84 will also cause the negative ions to be repelled to the conductive modulation structures i.e. the conductive plate 88 and the conductive stripes 92, where they will be neutralized. By biasing the accelerating electrode 84 positively, it is possible, if desired, to mark with negative ions.

In FIG. 6 the switch 96 is closed, for addressing the modulation electrode 92. The mix of positive and negative ions moving in the transport fluid stream A from the ion generation portion 26 to the ion modulation portion 80 comes under the influence of the transverse electric field extending between the modulation electrode 92 and its opposing modulation plate 88. As shown, negative ions are attracted to the positively biased modulation electrode and positive ions are attracted to the oppositely biased modulation plate. When the ions reach these respective conductive walls they will each recombine to form neutral gas atoms which pass through the channel 46 and into the ambient air, propelled by the transport fluid. It should be apparent that since positive ions are attracted to one of the modulation plate or the modulation electrode and the negative ions are attracted to the other, it is irrelevant whether the modulation electrode is biased either positively or negatively to perform its intended function.

In addition to the RF arc discharge from the polarization charges in the channel 46, adjacent the RF electrode 50, to the field electrode 52 described above, it has been found that, in the FIG. 5 embodiment, an RF arc discharge also occurs, between the polarization charges and both of the modulation elements 88 and 92. These elements, preferably made of brass, are not resistive to RF erosion, as is the platinum field electrode 52, and are subject to erosion, over time. In order to prevent the RF arc discharge from adversely affecting the modulation elements, an improved embodiment of the ion projection printing head 78 has been developed. The improved structure 102 is illustrated in FIG. 7. It differs from the FIGS. 5 and 6 embodiment primarily by the addition of a foil interface electrode 104, preferably also made of platinum, positioned between the dielectric body 44 and the dielectric interface plate 82. A reference voltage source 106 biased to about 100 volts DC is connected to the foil interface electrode 104. Thus located, the foil interface electrode concentrates the field and causes the additional arc discharges to occur between it and the polarization charges on the channel wall. This change completely arrests erosion of the modulation elements 88 and 92. Fortuitously, this structural change provides the additional benefit of yielding the same output ion current with a diminished RF voltage, in the range from 2000 to 3000 volts AC (peak-to-peak).

There is some reason to believe that increased ion output current may be realized by burying an additional RF electrode within the dielectric body 44 on the opposite side of the channel 46 and by mounting another exposed field electrode 52 thereat, i.e., by mirroring the ion generation portion 26 of FIGS. 5 or 7. This is because, with the structure of FIGS. 5 or 7, the positive and negative ions are believed to be created in the vicinity nearer the right hand channel wall, and to concentrate there. That conclusion has been drawn, from experimental results which show that significantly lower modulation voltages may be used for pulling the positive ions to the right hand modulating electrode, than by pulling them to the left hand modulating plate, suggesting a higher ion population in the right half of the slit and further suggesting that there would be room for an equally high ion population along the left hand wall.

It should be apparent that the present invention is a significant improvement over ion generating "writing" structures heretofore known. The channel entrained arc discharges confine the entire population of created ions in a useful zone where they can be easily transported through the device. The RF arc discharges create a plasma comprising substantially equal numbers of positive and negative ions so that there is no significant space charge limit to their creation. Furthermore, since the RF electrode is embedded, uniform arc discharges are enabled and an extremely rugged structure is provided.

It should be understood that the present disclosure has been made only by way of example, and that numerous changes in details of construction and the combination and arrangement of parts may be resorted to without departing from the true spirit and scope of the invention as hereinafter claimed.

What is claimed is:

1. A fluid jet assisted electrographic marking apparatus for placing electrostatic charges upon a charge receptor in an imagewise pattern, said apparatus being characterized by including means for supplying a transport fluid, housing means defining a channel therethrough, said channel being elongated in a direction transverse to the direction of movement of the transport fluid, through which the transport fluid may be directed to the charge receptor, said housing including an ion generation portion and an ion modulation portion, each portion being adjacent to said channel, and wherein said ion generation portion includes ion generating means located adjacent said channel and extending along the length of said channel for initiating a continuous series of RF arc discharges within said channel, for simultaneously creating a uniform supply of positive and negative ions along the length of said channel, directly in the transport fluid moving within said channel, and said ion modulation portion includes modulation means located adjacent said channel comprising a plurality of spaced, conductive, modulating electrodes on one side of said channel, a conductive member on the side of said channel opposite to said modulating electrodes, a source of modulating potential, switch means for selectively connecting said source of modulating potential to each of said modulating electrodes, and a second source of reference potential connected to said conductive member, whereby each of said modulating electrodes controls the passage of a beam of ions from said channel when its respective switch is energized.

2. The fluid jet assisted electrographic marking apparatus as defined in claim 1 characterized in that said ion generation portion comprises a dielectric body, and said ion generating means comprises a first conductive electrode embedded in said dielectric body adjacent said channel, an RF voltage source connected to said first electrode, a second conductive electrode located adjacent said channel and exposed to said transport fluid, and a source of reference potential connected to said second electrode.

3. The fluid jet assisted electographic marking apparatus as defined in claim 2 characterized in that said second electrode is supported by said body adjacent the entrance of said channel.

4. The fluid jet assisted electographic marking apparatus as defined in claim 3 characterized in that said first electrode comprises a platinum wire and said second electrode comprises a strip of platinum foil.

5. The fluid jet assisted electrographic marking apparatus as defined in claim 2 characterized in that said first electrode is located within a groove in said dielectric body, said groove extending into said body from said channel wall, dielectric filler material fills said groove between said first electrode and said channel wall, and said dielectric body, said first electrode and said dielectric filler material each have substantially the same coefficient of thermal expansion.

6. The fluid jet assisted electrographic marking apparatus as defined in claim 5 characterized in that said dielectric body and said dielectric filler material are inorganic materials.

7. The fluid jet assisted electrographic marking apparatus as defined in claim 1 characterized in that said ion generation portion comprises a dielectric body and said ion generating means comprises a first conductive electrode embedded in said dielectric body adjacent said channel, an RF voltage source connected to said first electrode, a second conductive electrode embedded in said dielectric body, a source of reference potential connected to said second electrode, and field concentrating means located adjacent said channel and exposed to said transport fluid, is associated with said second conductive electrode.

8. The fluid jet assisted electrographic marking apparatus as defined in claim 7 characterized in that said second electrode is located on the opposite side of said channel.

9. The fluid jet assisted electrographic marking apparatus as defined in claim 7 characterized in that said first and second electrodes are each located within a groove in said dielectric body, dielectric filler material fills each of said grooves, and said dielectric body, said first electrode, said second electrode and said dielectric filler material comprise inorganic materials having substantially the same coefficient of thermal expansion.

10. The fluid jet assisted electrographic marking apparatus as defined in claim 1 characterized in that dielectric interface means is located between said ion generation portion and said ion modulation portion.

11. The fluid jet assisted electrographic marking apparatus as defined in claim 10 characterized in that electrically conductive interface means is located between said ion generation portion and said dielectric interface means, and a second source of reference potential is connected to said conductive interface means.

12. A method for placing electrostatic charges upon a charge receptor in an imagewise pattern, by means of a fluid jet assisted electrographic marking apparatus, said method being characterized by including the steps of supplying a transport fluid directing the transport fluid to the charge receptor through an elongated channel in the electrographic marking apparatus, initiating a continuous series of RF arc discharges within the channel and uniformly along its length for simultaneously creating a uniform supply of positive and negative ions along the length of said channel, directly in the transport fluid moving within the channel, entraining the positive and negative ions within the transport fluid moving within the channel, and controlling the passage of ions exiting from the channel with a series of modulating electrodes, by addressing respective modulating electrodes for either passing or inhibiting the passage of selected beams of ions from the channel.

13. The method for placing electrostatic charges upon a charge receptor in an imagewise pattern, by means of a fluid jet assisted electrographic marking apparatus, as defined in claim 12 said method being characterized in that the transport fluid is air and said step of initiating RF arc discharges comprises the steps of imposing an RF voltage on an insulated electrode positioned in the vicinity of the channel, inducing uniform polarization charges on the insulating surface adjacent the electrode, inducing opposite charges on the surface of a spaced field electrode, and causing ion generating air breakdown to occur within the channel when the field between the opposite charges on the insulating surface and the field electrode becomes high enough.

14. The method for placing electrostatic charges upon a charge receptor in an imagewise pattern, by means of a fluid jet assisted electrographic marking apparatus, as defined in claim 12 said method being characterized in that said step of initiating RF arc discharges is cyclical and self quenching.

15. A fluid jet assisted ion projection apparatus for placing electrostatic charges upon a charge receptor, said apparatus being characterized by including means for supplying a transport fluid, and housing means defining a channel therethrough, said channel being elongated in a direction transverse to the direction of movement of the transport fluid, through which the transport fluid may be directed to the charge receptor, said housing including ion generating means, located adjacent said channel, and extending along the length of said channel for initiating a continuous series of RF arc discharges within said channel, for simultaneously creating a uniform supply of positive and negative ions along the length of said channel, directly in the transport fluid moving within and through said channel.

16. The fluid jet assisted ion projection apparatus as defined in claim 15 characterized in that said ion generation means comprises a dielectric body, a first conductive electrode embedded in said dielectric body adjacent said channel, an RF voltage source connected to said first electrode, a second conductive electrode exposed to said fluid adjacent said channel, and a second source of reference potential connected to said second electrode.

17. The fluid jet assisted ion projection apparatus as defined in claim 16 characterized in that said second electrode is supported by said body adjacent the entrance of said channel.

18. The fluid jet assisted ion projection apparatus as defined in claim 16 characterized in that said first electrode is located within a groove in said dielectric body, said groove extending into said body from said channel wall, dielectric filler material fills said groove between said first electrode and said channel wall, and said dielectric body, said first electrode and said dielectric filler material each have substantially the same coefficient of thermal expansion.

* * * * *